(12) United States Patent
Kogure et al.

(10) Patent No.: US 6,734,589 B2
(45) Date of Patent: May 11, 2004

(54) ELECTRIC MOTOR

(75) Inventors: Satoshi Kogure, Gunma (JP); Iwao Tsurubuchi, Gunma (JP); Wataru Mochizuki, Kiryu (JP); Atsushi Maeda, Ota (JP); Fumiaki Koshio, Takasaki (JP); Tomohiro Usami, Kiryu (JP); Yoshinari Tabuki, Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/140,577

(22) Filed: May 7, 2002

(65) Prior Publication Data

US 2002/0167238 A1 Nov. 14, 2002

(30) Foreign Application Priority Data

May 10, 2001 (JP) .................................. 2001-139740
May 10, 2001 (JP) .................................. 2001-139741

(51) Int. Cl.[7] .................................................. H02K 5/00
(52) U.S. Cl. .................... 310/89; 310/DIG. 6; 310/43; 310/239
(58) Field of Search .................... 310/89, 71, 68 B, 310/68 R, DIG. 6, 67 R, 238, 239, 43

(56) References Cited

U.S. PATENT DOCUMENTS

| | | | |
|---|---|---|---|
| 3,707,638 A | * 12/1972 | Nailen ......................... 310/152 |
| 3,790,832 A | * 2/1974 | Patel ........................... 310/113 |
| 3,924,147 A | * 12/1975 | Tarnow et al. ............. 310/68 R |
| 4,396,850 A | * 8/1983 | Herr ............................ 310/239 |
| 4,501,983 A | * 2/1985 | Schmider .................... 310/113 |
| 4,572,979 A | * 2/1986 | Haar et al. ................. 310/68 R |
| 4,728,834 A | * 3/1988 | Kumar et al. .............. 310/68 R |
| 4,857,812 A | 8/1989 | Mochizuki et al. ........... 318/15 |
| 5,610,456 A | * 3/1997 | Wille et al. .................... 310/58 |

* cited by examiner

Primary Examiner—Dang Le
(74) Attorney, Agent, or Firm—McCormick, Paulding & Huber LLP

(57) ABSTRACT

The invention provides an electric motor in which a cost is reduced by reducing a number of the parts, and an electric motor in which a freedom of placement is increased. A motor assembly has a yoke and a front bracket closing an open end of the yoke. The front bracket is formed in a closed-end cylindrical shape by an aluminum die casting, and a brush holder for holding a brush is received in an inner portion. A motor controller for controlling the motor assembly is formed as an electronic circuit having a communication portion, a control portion and a driver portion, and this electronic circuit is mounted on an inner peripheral surface of the front bracket. Further, the electronic circuit constituting the motor controller may be mounted on the brush holder.

5 Claims, 6 Drawing Sheets

ELECTRIC MOTOR

This application is entitled to the benefit of and incorporates by reference essential subject matter disclosed in Japanese Patent Application number 2001-139740 filed on May 10, 2001 and Japanese Patent Application number 2001-139741 filed on May 10, 2001.

TECHNICAL FIELD OF THE INVENTION

The present invention relates to an electric motor having a control device constituted by an electronic circuit.

BACKGROUND OF THE INVENTION

The electric motor corresponds to an apparatus which converts an electric current supplied from a power source into a mechanical rotational motion so as to output, and is widely employed from parts for a motor vehicle such as a wiper system down to consumer appliances such as an OA device, an AV device and the like.

A motor assembly of a direct-current motor with brush corresponding to one kind of the electric motor mentioned above has a yoke. A permanent magnet is fixed to an inner peripheral surface of the yoke, and is structured such as to supply a magnetic flux to an inner portion of the yoke. Further, a rotor which is positioned in the magnetic flux and corresponds to an armature is rotatably received within the yoke, and the rotor is provided with a plurality of armature coils. Further, a commutator to which a plurality of commutator segments are radially mounted is axially attached to a rotary shaft of the rotor, and a plurality of brushes supported by a brush holder are slidably in contact with the commutator. Further, an electric current rectified by the commutator is supplied to an armature coil by supplying a direct current to the brushes, and an electromagnetic force is generated in the armature coil positioned in the magnetic field of the permanent magnet, whereby the rotor is rotated.

In the direct-current motor with brush, a motor controller for controlling an operation of the motor is connected to the motor assembly. The motor controller is independently provided from the motor assembly, and is provided therein with an electronic circuit, for example, a flat wiring substrate for switching a rotational direction of the rotor and performing an intermittent motion in the case of a direct-current motor with brush employed in a wiper apparatus provided in the motor vehicle.

SUMMARY OF THE INVENTION

In the direct-current motor with brush mentioned above, the motor controller is independently provided from the motor assembly, and is structured such as to be connected to the motor assembly by a wire having a connector or the like. Accordingly, in addition to the motor assembly, parts such as a casing of the motor controller, the wiring substrate, the connector, the wiring and the like are required, whereby a cost reduction of the direct-current motor with brush is prevented.

Further, since it is necessary to secure a motor controller mounting portion other than the mounting portion of the motor assembly, a freedom of placing the direct-current motor with brush become narrower.

An object of the present invention is to provide an electric motor in which a cost is reduced by reducing a number of the parts.

Another object of the present invention is to provide an electric motor in which a freedom of placement of the motor is increased.

In accordance with the present invention, there is provided an electric motor converting an electric energy into a mechanical rotational energy comprising:

a motor assembly having a motor housing which receives a magnetic field system for supplying a magnetic flux and having an armature provided with an armature coil; and a control device, which is provided in an inner portion of the motor housing, and in which an electronic circuit for controlling the motor assembly is formed.

In accordance with the present invention, there is provided an electronic motor, wherein the electronic circuit is formed on an inner peripheral surface of the motor housing.

In accordance with the present invention, there is provided an electric motor, wherein the motor housing is formed by a yoke formed in a closed-end cylindrical shape and a lid member mounted to an opening end of the yoke, the lid member is formed in a closed-end cylindrical shape, and the electronic circuit is formed on an inner peripheral surface of the lid member.

In accordance with the present invention, there is provided an electric motor, wherein the lid member is made of a heat radiation material.

In accordance with the present invention, there is provided an electric motor further comprising:

a brush holder mounted to the lid member;

a brush holding portion fixed to the brush holder and having a connecting terminal provided at a position opposing to the lid member; and a brush supported by the brush holding portion and slidably in contact with a commutator axially attached to a rotary shaft of the armature, wherein the connecting terminal and the electronic circuit are connected by mounting the brush holder to the lid member.

In accordance with the present invention, there is provided an electric motor further comprising:

a rotary shaft to which the armature is fixed, and rotatably supported to the housing;

a commutator axially attached to the rotary shaft, and connected to the armature coil; and a brush holder provided in an inner portion of the motor housing, and holding a brush slidably in contact with the commutator, wherein the electronic circuit is formed in the brush holder.

In accordance with the present invention, there is provided an electric motor, wherein the brush holder is formed in a closed-end cylindrical shape, and the electronic circuit is formed on at least any one of an outer peripheral surface and a bottom surface of the brush holder.

In accordance with the present invention, there is provided an electric motor, wherein the brush holder is made of a heat-radiation and electromagnetic resistance material.

In accordance with the present invention, there is provided an electric motor, wherein the brush holder is formed of a metal plate and covered by a resin material.

DESCRIPTION OF THE PREFERRED EMBODIMENTS

A description will be in detail given below of embodiments in accordance with the present invention with reference to the accompanying drawings.

Figure 1:
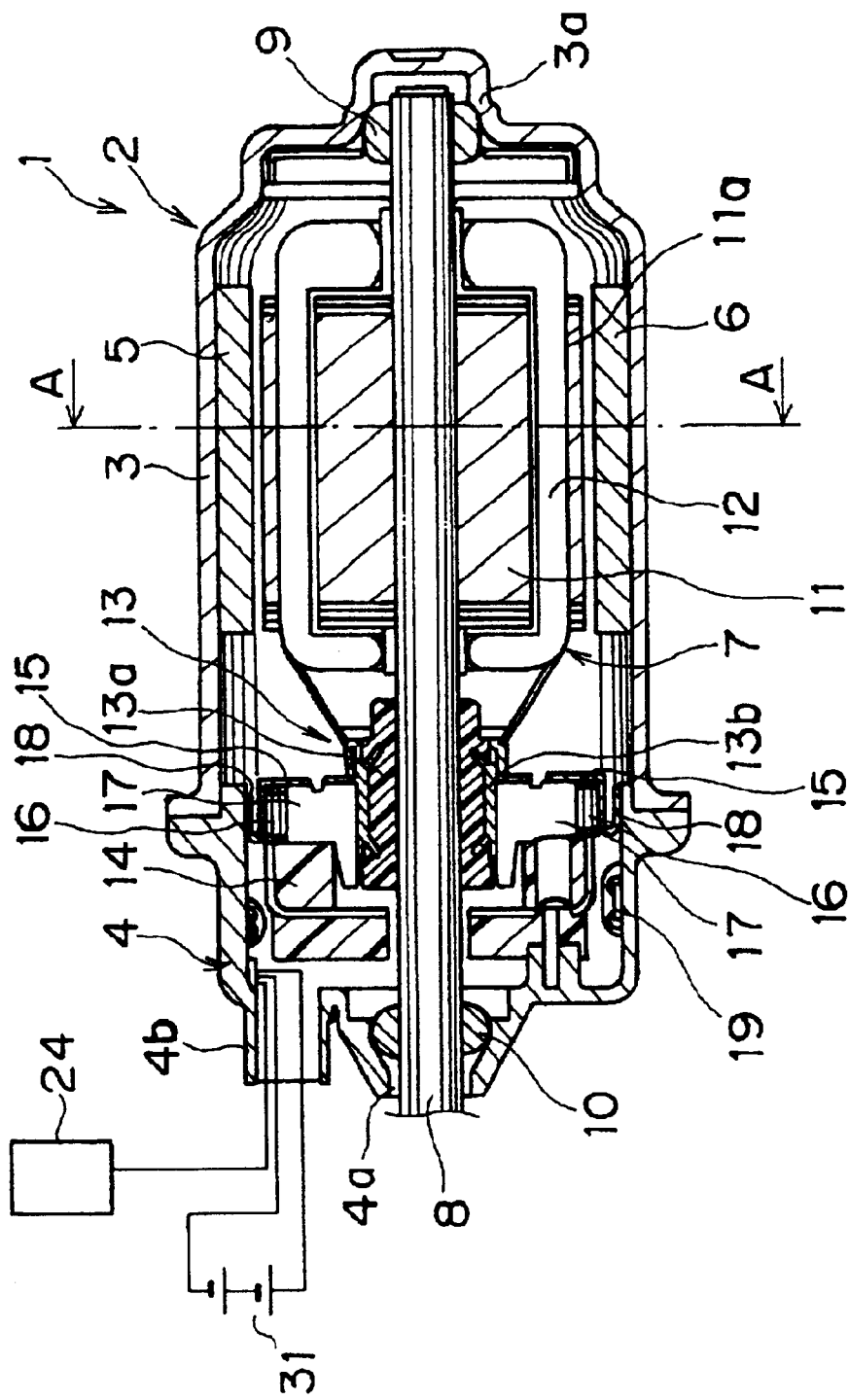
FIG. 1 is a cross sectional view showing a direct-current motor with brush in accordance with an embodiment of the present invention.
Figure 2:
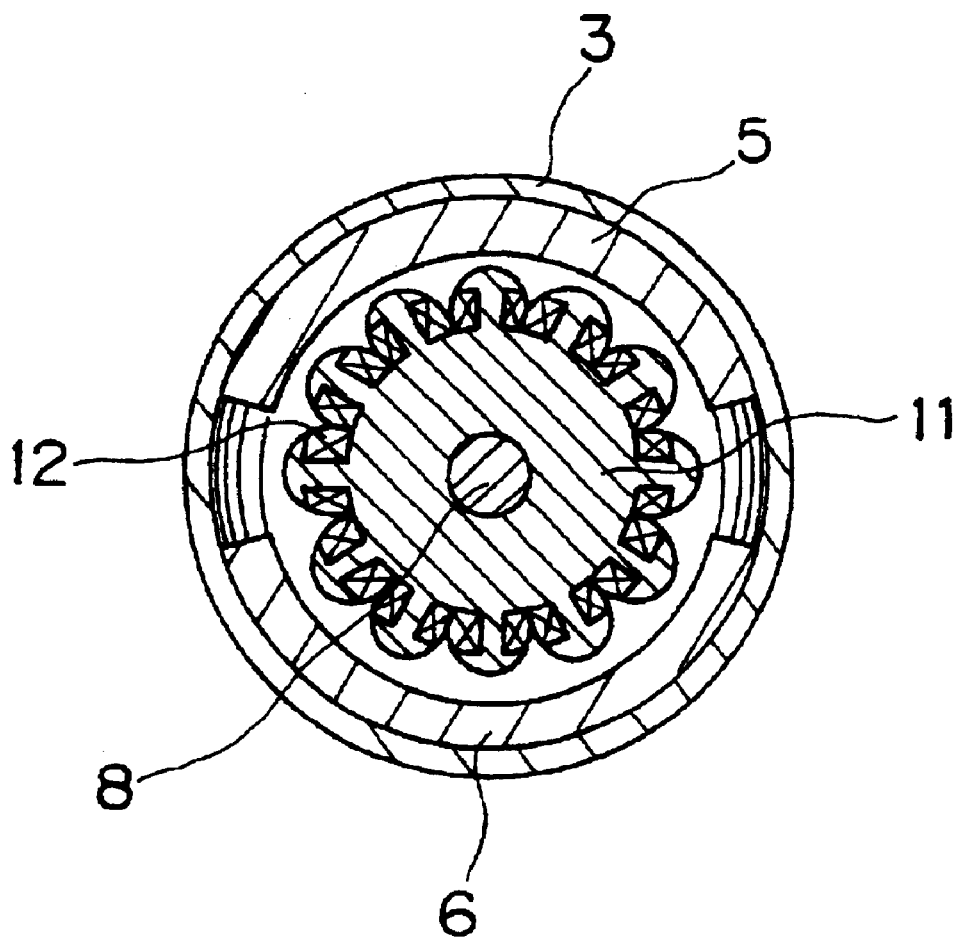
FIG. 2 is a cross sectional view showing a cross section along a line A—A of the direct-current motor with brush shown in FIG. 1.

A direct-current motor with brush corresponding to an electric motor shown in FIG. 1 is employed in a wiper apparatus provided in a motor vehicle. A motor assembly 1 of the direct-current motor with brush has a motor housing 2. The motor housing 2 has a yoke 3 which is formed in a closed-end cylindrical shape and obtained by press drawing a deep drawing steel sheet. A front bracket 4 corresponding to a lid member is mounted to an opening end of the yoke 3 by a fastening member (not shown). The front bracket 4 is made of an aluminum alloy as being a heat radiation material and formed in a closed-end cylindrical shape by die-casting. According to this embodiment, the front bracket 4 is made of an aluminum alloy but it may be formed by other materials such as metal or resin having a heat radiation property.

Two segment-shaped permanent magnets 5 and 6 are received in an inner peripheral surface of the yoke 3, and the magnets corresponds to a magnetic field system in which different magnetic poles are arranged so as to face to each other, whereby a magnetic flux is supplied to an inner portion of the yoke 3. An armature 7 is received in the inner portion of the yoke 3 so as to be positioned in the magnetic field. The armature 7 has a shaft 8 corresponding to the rotary shaft of the armature 7 which is supported by self-aligning bearings 9 and 10 respectively provided in a bottom portion 3a of the yoke 3 and a through hole 4a formed in the front bracket 4. Thus, the armature 7 is rotatably supported in the yoke 3. Further, a front end of the shaft 8 protrudes outward from the through hole 4a and is connected to a wiper shaft (not shown) via a speed reduction mechanism (not shown).

An armature core 11 formed by stacking a lot of armature die cut sheets is axially attached to the shaft 8, and twelve slots 11a are formed in an outer periphery of the armature core 11. A copper wire which is insulated on a surface thereof is wound around each of the slots 11a, whereby an armature coil 12 is formed. In this case, in the present embodiment, a number of the slots 11a is set to twelve, however, it can be set to an optional number without being limited thereto in accordance with the specification of the motor assembly 1.

Further, a commutator 13 is axially attached to the shaft 8 so as to be positioned at a left side in the drawing of the armature 11. The commutator 13 is constituted by a body portion 13a fixed to the shaft 8 and commutator bars 13b radially arranged in an outer periphery of the body portion 13a, and each of the commutator bars 13a is connected to the armature coil 12.

A brush holder unit 14 as a brush holder, which is formed in a closed-end cylindrical shape and is mounted to an inner portion of the front bracket 4, and two brush holding portions 15 are fixed to the brush holder unit 14. These brush holding portions 15 support brushes 17 slidably in contact therewith in a state of being energized toward the commutator bars 13b of the commutator 13 by respective springs 16. That is, the brushes 17 are held by the brush holder unit 14 via the brush holding portions 15. Further, connecting terminals 18 formed so as to be capable of elastically deforming in a diametrical direction of the front bracket 4 are provided at positions opposing to the inner peripheral surface of the front bracket 4 of the respective brush holding portions 15, and these connecting terminals 18 are electrically connected to the brushes 17, respectively. Accordingly, when supplying an electric current to the connecting terminals 18, an electric current rectified via the respective brushes 17 and the commutator 13 flows through the armature coil 12 positioned in the magnetic flux, and a rotational force is generated in the armature 7 on the basis of Fleming's left hand rule. Namely, the electric energy supplied to the armature coil 12 is converted into the mechanical and rotational energy for the armature 7. In the present embodiment, two brushes 17 supported by the brush holding portions 15 are provided, however, the number of the brushes is not limited to this, and may be set to any as far as it is plural number.

The structure is made such that a rotation of the armature 7 is transmitted to a wiper shaft via a speed reduction mechanism (not shown). Accordingly, in order to make the wiper shaft execute a swing motion, it is necessary to switch a direction of the electric current supplied to the brushes 17 at a predetermined timing, and at a time of performing an intermittent motion for operating the wiper apparatus at a fixed interval, it is necessary to adjust a timing of supplying the electric current to the respective brushes 17.

Accordingly, a motor controller 19 corresponding to the control device for controlling the motor assembly 1 is provided in the inner portion of the front bracket 4. Thus, the structure is made such that the electric current supplied to the motor assembly 1, that is, the electric current supplied to the armature coil 12 is controlled by the motor controller 19.

Figure 3:
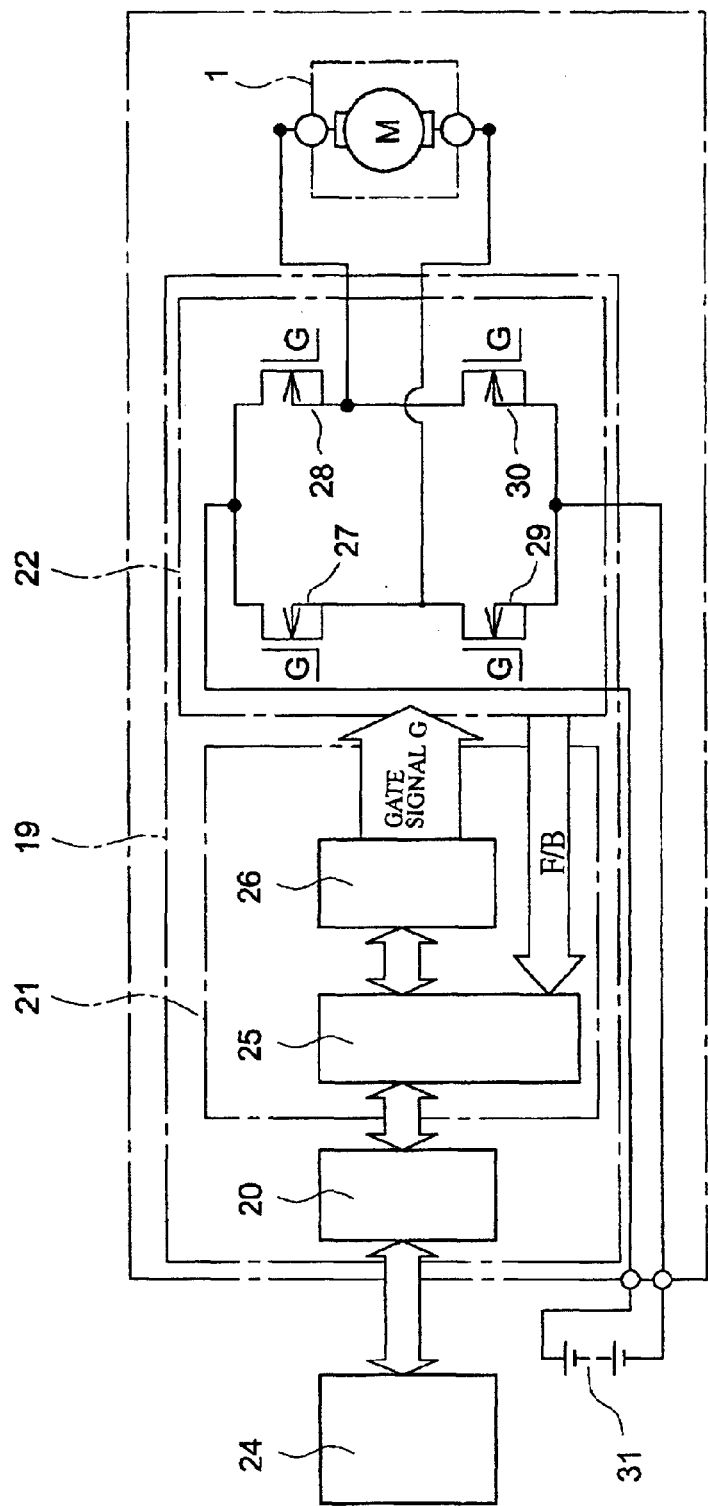
FIG. 3 is a block diagram of an electronic circuit showing a control system of a motor controller for controlling an operation of the direct-current motor with brush shown in FIG. 1.
Figure 4:
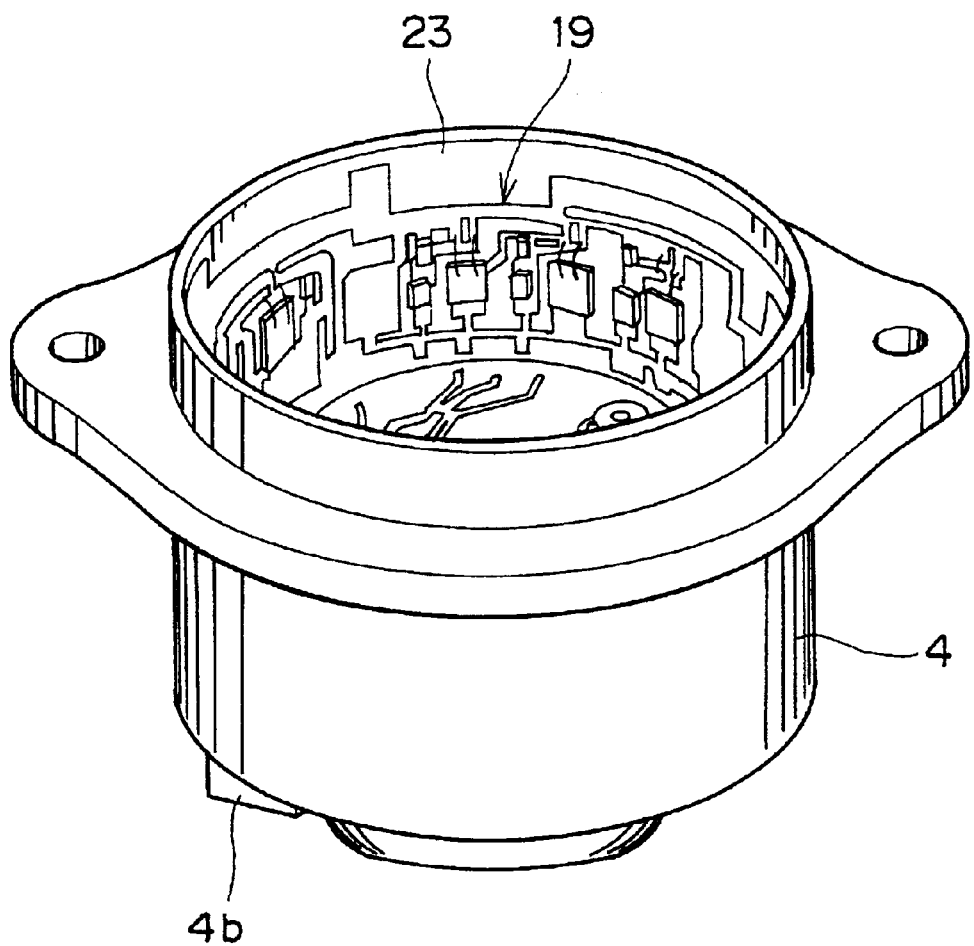
FIG. 4 is a perspective view showing a front bracket to which the motor controller shown in FIG. 3 is mounted.

As shown in FIG. 3, the motor controller 19 has a communication portion 20, a control portion 21 and a driver portion 22, and the respective portions constituting the motor controller 19 are formed by electronic circuits. These electronic circuits are formed, as shown in FIG. 4, by mounting electronic parts to a wiring formed on an insulating layer 23 formed in the inner peripheral surface of the front bracket 4. Further, the connecting terminals 18 mounted to the respective brush holding portions 15 are structured such as to be in contact with the electronic circuits forming the driver portion 22 of the motor controller 19 by mounting the brush holder unit 14 to the front bracket 4.

As mentioned above, since the electronic circuits constituting the motor controller 19 are provided on the inner peripheral surface of the front bracket 4, there is no need to provide any parts such as a connector and a wiring or the like which connect the motor controller 19 to the motor assembly 1, and no need to provide a casing of a main body, a wiring substrate and the like constituting the motor controller 19, so that it is possible to reduce the number of the parts of the direct-current motor with brush so as to reduce a cost thereof.

Further, since the motor controller 19 is installed in the motor assembly 1, there is no consideration required for obtaining a space on which the motor controller 19 is mounted, within a limited space of the motor vehicle, and a freedom of placing the direct-current motor with brush can be increased.

Further, since the front bracket 4 is formed by the aluminum die casting, a heat radiation property is high. Accordingly, a heat radiation property of the electronic circuit mounted to the front bracket 4 is improved, so that it is possible to make a heat radiation structure simple so as to manufacture the direct-current motor with brush in compact size.

Further, since it is possible to connect the respective brushes 17 to the motor controller 19 via the respective connecting terminals 18 by mounting the brush holder unit 14 to the front bracket 4, a conventional welding operation or the like for connecting the respective brushes 17 to the motor controller 19 is not required, so that it is possible to reduce an assembling man hour of the direct-current motor with brush. Further, since the heat generated in the respective brushes 17 is radiated to the front bracket 4 via the connecting terminal 18, it is possible to improve a property and a service life of the brush 17.

The communication portion 20 of the motor controller 19 is connected to an electronic control unit (ECU) 24 via a connection portion 4b formed in the front bracket 4, and the structure is made such that an operation command given from a wiper switch (not shown) is input to the ECU 24. Accordingly, the structure is made such that an operation command given from the wiper switch (not shown), that is, an operation command for stopping, starting and intermittently driving the wiper apparatus is input to the control portion 21 connected to the communication portion 20 via the ECU 24 and the communication portion 20.

A main control portion 25 and a pre-driver 26 are provided in the control portion 21. The main control portion 25 receives the operation command from the ECU 24 and controls the pre-driver 26 so as to generate a predetermined gate signal G corresponding to the operation command.

Four power switching elements 27 to 30 constituting the driver portion 22 form a bridge circuit, and the circuit is connected to a battery 31 mounted to the vehicle. These power switching elements 27 to 30 become in a state of capable of applying an electric current when the gate signal G is input, and accordingly, it is possible to switch a direction of the electric current output from the driver portion 22 by switching the power switching element, to which the gate signal G from the pre-driver 26 is input, into the power switching element 27 and the power switching element 30 or into the power switching element 28 and the power switching element 29 respectively. Further, it is possible to stop the electric current supply to the respective brushes 17 by setting all of the power switching elements 27 to 30 in a state of applying no electric current. As these power switching element, a transistor, a thyristor or the like may be employed.

The electronic circuit of the driver portion 22 is structured such as to be in contact with the contact terminal 18 mounted to the respective brush holding portions 15, and the structure is made such that the electric current output from the driver portion 22 is supplied to the brush 17 at this contact point. Accordingly, the electric current controlled in a predetermined direction is supplied from the driver portion 22 toward the brush 17 on the basis of the gate signal G generated in accordance with the operation command given from the ECU 24. Further, the operation state of the power switching elements 27 to 30 is fed back toward the main control portion 25 at any time.

The motor assembly 1 is controlled by controlling the electric current supplied to the armature coil 12 via the brush 17 by means of the motor controller 19. That is, it is possible to make the wiper apparatus execute the predetermined operation by controlling the rotation of the direct-current motor with brush by means of the motor controller 19.

It goes without saying that the present invention is not limited to the embodiment mentioned above, and can be variously modified within the range of the scope of the invention. For example, in the present embodiment, there is shown a case in which the present invention is applied to the direct-current motor with brush employed in the wiper apparatus of the motor vehicle, however, the structure is not limited to this, and the present invention can be applied to any electric motor having a control device such as a brushless direct-current motor, an AC motor and the like.

In accordance with the present invention, since the control device conventionally provided independently from the motor assembly can be installed in the motor assembly, the parts such as the casing of the control device, the wiring substrate, the connector, the wiring and the like are not required, so that it is possible to reduce the number of the parts of the electric motor so as to reduce the cost.

Further, in accordance with the present invention, since the control device is installed in the motor assembly, it is not necessary the mounting portion of the control device is independently provided, and it is possible to increase the freedom of placing the electric motor.

Further, in accordance with the present invention, since the electronic circuit of the control device is directly constructed on the inner peripheral surface of the lid member made of the heat radiation material, the heat radiation property of the electronic circuit is improved, and it is possible to make the heat radiation structure simple so as to make the electric motor compact. Further, it is possible to improve the freedom of designing the electronic circuit and the front bracket.

Further, in accordance with the present invention, since the connecting terminal and the control device are connected by mounting the brush holder to the lid member, a welding, a connector or the like is not required, so that it is possible to reduce an assembling man hour of the electric motor. Further, since it is possible to radiate the heat generated in the brush to the lid member, it is possible to improve the property and the service life of the brush.

Figure 5:
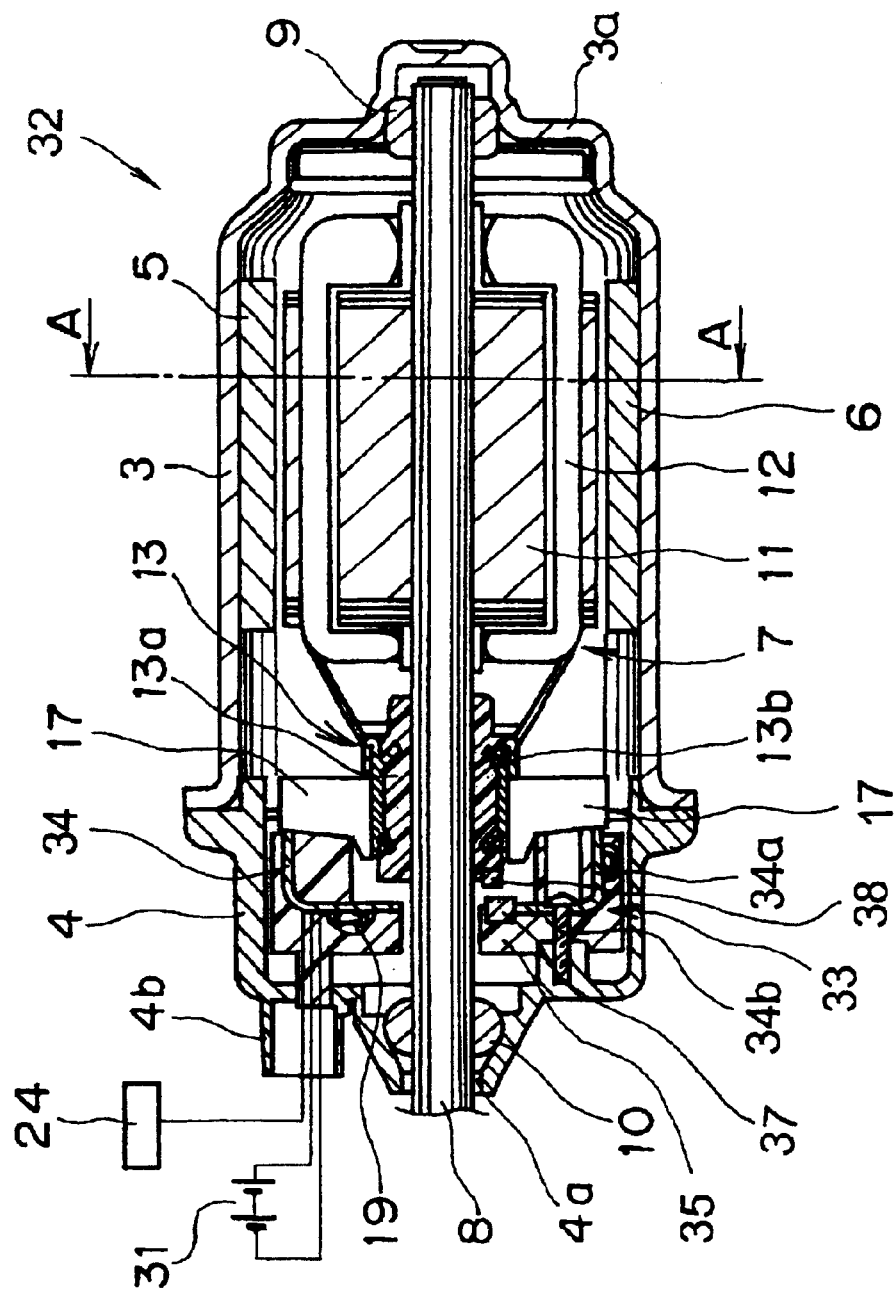
FIG. 5 is a cross sectional view showing a direct-current motor with brush in accordance with another embodiment of the present invention.
Figure 6:
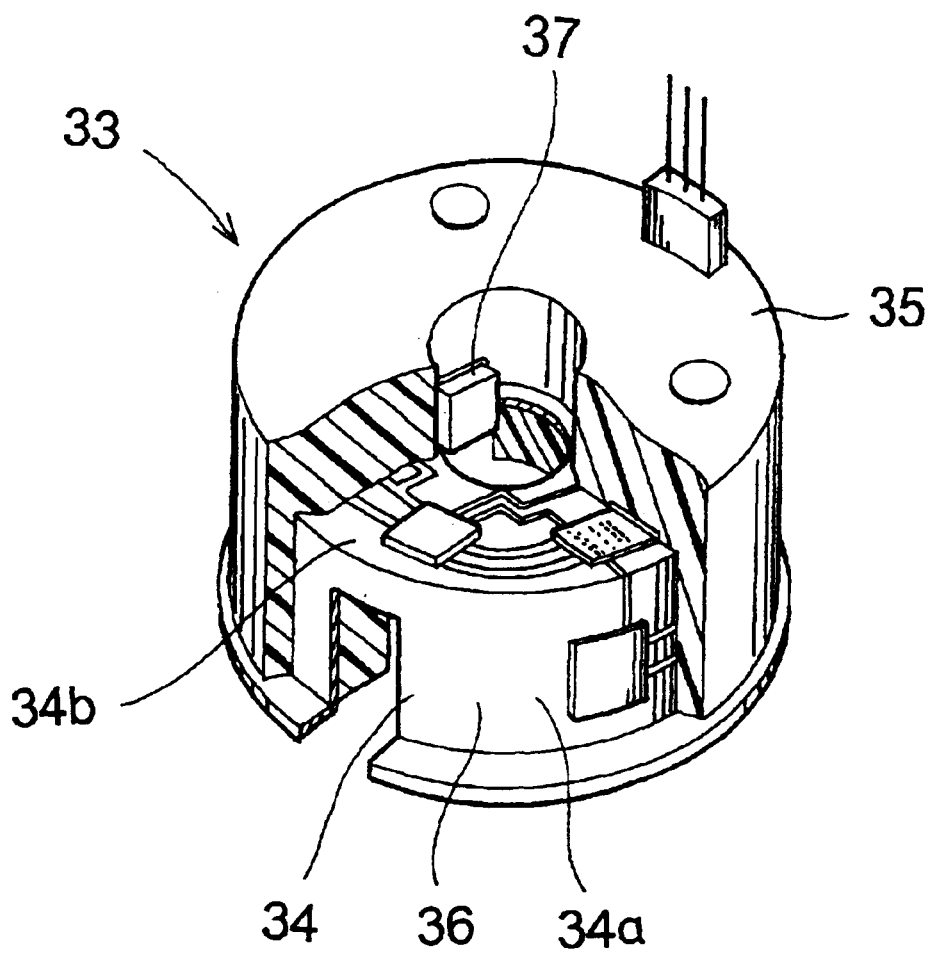
FIG. 6 is a partly notched perspective view showing details of a brush holder shown in FIG. 5.

FIG. 5 is a cross sectional view showing a direct-current motor with brush corresponding to another embodiment in accordance with the present invention, and FIG. 6 is a partly notched perspective view showing details of a brush holder shown in FIG. 5. In this case, in FIGS. 5 and 6, the same reference numerals are attached to the corresponding members to the members mentioned above.

A motor assembly 32 of the direct-current motor with brush shown in FIG. 5 has the same basic structure as that of the direct-current motor with brush shown in FIG. 1. Further, in the direct-current motor with brush shown in FIG. 5, the structure is made such that the motor controller 19 provided in the inner peripheral surface of the front bracket 4 in the direct-current motor with brush shown in FIG. 1 is provided in a brush holder unit 33.

As shown in FIG. 5, the brush holder unit 33 in the motor assembly 32 is provided in an inner portion of the front bracket 4. The brush holder unit 33 is constituted by a brush holder 34 formed in a closed-end cylindrical shape by drawing a metal plate as a material of a heat-radiation and electromagnetic resistance, and by a resin portion 35 formed so as to cover the brush holder 34, in detail as shown in FIG. 6. According to this embodiment, the brush holder 34 is formed by a metal plate but it is not limited to this, so that the brush holder 34 may be formed by other metal or resin materials or so, having a property of heat radiation and electromagnetic resistance.

An outer diameter of the brush holder unit 33 is formed so as to be substantially the same as an inner diameter of the front bracket 4, and a mounting portion to the front bracket 4, a fitting portion to the connecting portion 4b formed in the front bracket 4 and the like are formed. Accordingly, it is easy to determine its position at a time assembling the brush holder unit 33 in the front bracket 4, and an assembling property of the brush holder 34 to the motor assembly 32 is improved.

As the motor controller 19, the same structure as that in the case of the direct-current motor with brush shown in FIG. 1 is employed. That is, the motor controller 19 has the communication portion 20, the control portion 21 and the driver portion 22 as shown in FIG. 3, and the respective portions constituting the motor controller 19 are formed by the electronic circuit. Further, the electronic circuit is formed on an outer peripheral surface 34a and a bottom surface 34b of the brush holder 34, as shown in FIG. 6, is positioned at an inner portion of the resin portion 35 and is integrally formed with the brush holder unit 33. Further, an insulating layer 36 is formed between the brush holder 34 and the electronic circuit, and the brush holder 34 and the electronic circuit are electrically insulated with each other. In this case, in the present embodiment, the motor controller 19 is formed on the outer peripheral surface 34a and the bottom surface 34b of the brush holder 34, however, the structure is not limited, the motor controller may be formed on any one of the outer peripheral surface 34a and the bottom surface 34b.

Since there is not required for the connector, the wiring or the like for connecting the motor controller 19 and the motor assembly 32 as well as the casing of the main body, the wiring substrate and the like which constitute the motor controller 19 because of providing the motor controller 19 of the direct-current motor with brush in the brush holder unit 33 positioned in the inner portion of the motor housing 2, it is possible to reduce the number of the parts of the direct-current motor with brush so as to reduce the cost.

Further, since the motor controller 19 is installed in the motor assembly 32, there is no consideration required for obtaining a space on which the motor controller 19 is mounted, within a limited space of the motor vehicle, and therefore a freedom of placing the direct-current motor with brush can be increased.

Further, since the brush holder 34 is formed in the closed-end cylindrical shape, it is possible to form an electronic circuit on an outer periphery 34a thereof as well as on a bottom surface 34b of the brush holder 34, so that it is possible to increase a mounting surface of the electronic circuit and it is possible to form a more complex electronic circuit.

Further, since the brush holder unit 33 and the motor controller 19 are integrally formed by the resin, it is possible to easily apply this invention to the conventional direct-current motor with brush by forming the outer shape of the brush holder unit 33 in the same shape as the brush holder of the conventional direct-current motor with brush.

Further, since the main body of the brush holder is made of the metal, it is possible to shield a commutation noise generated from a slidably contact surface between the commutator bar 13a and the brush 17 and a radiation noise of a rotating magnetic field given by the armature 7. Accordingly, it is possible to reduce an influence of the noise against the electronic parts constituting the motor controller 19, it is possible to prevent the motor controller 19 from being erroneously operated, and it is possible to prevent the commutation noise from being radiated to the external portion.

A magnetic sensor 37 is mounted to a position of the main body of the brush holder opposing to the commutator 13, and a magnet 38 is mounted to a front end of the commutator 13. The magnetic sensor 37 is connected to the electronic circuit of the motor controller 19, and is structured such as to be capable of detecting a rotational number of the direct-current motor with brush in response to the magnet 38 integrally rotating with the armature 7. The rotational number detected by the magnetic sensor 37 is fed back toward the main control portion 25 at any time, and it is possible to execute a more accurate control. In accordance with the structure mentioned above, it is possible to add a sensor function for detecting the rotational number of the armature 7 without changing an outer shape of the motor assembly 32. Further, it is possible to easily select an incremental type or an absolute type by increasing or reducing the number of the magnetic sensor 37 and the magnet 38. In this case, in the present embodiment, there is employed the sensor constituted by the magnetic sensor 37 and the magnet 38, however, the structure is not limited to this, the other types of sensors such as an optical sensor, a contact type sensor or the like may be employed.

It goes without saying that the present invention is not limited to the embodiment mentioned above, and can be variously modified within the range of the scope of the invention.

In accordance with the present invention, since the control device can be installed in the motor assembly, the parts such as the casing of the control device, the wiring substrate, the connector, the wiring and the like are not required, so that it is possible to reduce the number of the parts of the direct-current motor with brush so as to reduce the material cost.

Further, since the control device is installed in the motor assembly, it is not necessary that the mounting portion of the control device is independently provided, and it is possible to improve the freedom of placing the direct-current motor with brush.

Further, since the control device is provided on the brush holder, and they are integrally formed by the resin, it is possible to give a compatibility with the brush holder of the conventional direct-current motor with brush, so that it is possible to apply this invention without changing the shape of the conventional direct-current motor with brush. Further, it is possible to improve an assembling property between the front bracket and the brush holder.

Further, since the brush holder is formed in the closed-end cylindrical shape, it is possible to increase the mounting surface of the electronic circuit constituting the control device, so that it is possible to form a more complex electronic circuit.

Further, since the brush holder is made of the material having a property of heat radiation and electromagnetic resistance, it is possible to shield a commutation noise generated from a slidably contact surface between the commutator and the brush and a radiation noise of a rotating magnetic field given by the armature or the like, so that it is possible to prevent the electronic parts constituting the motor controller from being erroneously operated, and it is possible to prevent the commutation noise from being radiated to the external portion.

What is claimed is:

1. An electric motor converting an electric energy into a mechanical rotational energy comprising:
   a motor assembly having a motor housing, said motor housing receiving a magnetic field system for supplying a magnetic flux to an inner portion of said motor housing and receiving an armature provided with an armature coil; and
   a control device, which is provided in the inner portion of said motor housing, and in which an electronic circuit for controlling said motor assembly is formed,
   wherein said motor housing is formed by a yoke formed in a closed-end cylindrical shape and by a lid member mounted to an opening end of said yoke, said lid member is formed in a closed-end cylindrical shape, and said electronic circuit is formed on an inner peripheral surface of said lid member.

2. An electric motor according to claim 1, wherein said lid member is made of a heat radiation material.

3. An electric motor according to claim 1, further comprising:
   a brush holder mounted to said lid member;
   a brush holding portion fixed to said brush holder and having a connecting terminal provided at a position opposing to said lid member; and
   a brush supported by said brush holding portion and slidably in contact with a commutator axially attached to a rotary shaft of said armature,
   wherein said connecting terminal and said electronic circuit are connected by mounting said brush holder to said lid member.

4. An electric motor converting an electric energy into a mechanical rotational energy comprising:
   a motor assembly having a motor housing, said motor housing receiving a magnetic field system for supplying a magnetic flux to an inner portion of said motor housing and receiving an armature provided with an armature coil;
   a control device, which is provided in the inner portion of said motor housing, and in which an electronic circuit for controlling said motor assembly is formed;
   a rotary shaft to which said armature is fixed, and rotatably supported to said housing;
   a commutator axially attached to said rotary shaft, and connected to said armature coil; and
   a brush holder provided in an inner portion of said housing, and holding a brush slidably in contact with said commutator,
   wherein said electronic circuit is formed in said brush holder,
   wherein said brush holder is formed in a closed-end cylindrical shape, and said electronic circuit is formed on at least any one of an outer peripheral surface and a bottom surface of said brush holder, and
   wherein said brush holder is made of a heat-radiation and electromagnetic resistance material.

5. An electric motor according to claim 4, wherein said brush holder is formed by a main body of said brush holder on which said electronic circuit is formed, and formed by a resin portion covering said main body of said brush holder.

* * * * *